United States Patent Office 3,772,294
Patented Nov. 13, 1973

3,772,294
PROCESS FOR MAKING PYRAZOLO-(3,4-d)-PYRIMIDINES
Ctirad Podesva, Montreal, Quebec, Vaclav Musil, Ville la Salle, Quebec, and William T. Scott, Ville de Lery, Quebec, Canada, assignors to Delmar Chemicals Limited, Ville la Salle, Quebec, Canada
No Drawing. Filed Apr. 13, 1970, Ser. No. 28,117
Claims priority, application Great Britain, Apr. 17, 1969, 19,684/69
Int. Cl. C07d 57/16
U.S. Cl. 260—256.4 F          10 Claims

ABSTRACT OF THE DISCLOSURE

This invention relates to a novel and improved process for the preparation of defined 4-X-6-R-1-pyrazolo-(3,4-d) pyrimidine compounds. Included among these compounds is 4-hydroxy - 1 - pyrazolo-(3,4-d)-pyrimidine, commonly referred to as allopurinol, a drug useful in the treatment of hyperuricemia associated with gout and other conditions. This particular compound is prepared according to this invention in a two-stage reaction sequence, outlined in the flow sheet, involving the initial formation, through a novel and advantageous cyclisation reaction, of a 4-halo-1-pyrazolo-(3,4-d)-pyrimidine compound which is then converted (by hydrolysis of the 4-halo group) into the desired 4-hydroxy-1-pyrazolo-(3,4-d)-pyrimidine.

```
    ┌─────────────────────────┐
    │  4,6-dihalo-5-formyl    │
    │       pyrimidine        │
    │   + hydrazine hydrate   │
    └─────────────────────────┘
Low
Temperature  │ (i) Dioxane or H₂O
Cyclisation  │ (ii) 0° to 30° C.
             ▼
    ┌─────────────────────────┐
    │   4-halo-1-pyrazolo-    │
    │   (3,4-d)-pyrimidine    │
    └─────────────────────────┘
Hydrolysis   │ (i) Aqueous solution
             │ (ii) Δ
             ▼
    ┌─────────────────────────┐
    │       Allopurinol       │
    │   rel. pure/good yield  │
    └─────────────────────────┘
```

BACKGROUND OF THE INVENTION (a) Field of the invention

The present invention relates to processes for manufacturing pyrazole - (3,4-d) - pyrimidine compounds. More particularly this invention is concerned with improved processes for manufacturing 4-X-6-R-1-pyrazolo-(3,4-d)-pyrimidine compounds of the following general formula:

(I)

wherein X represents a halogen atom, a free or substituted hydroxyl, amino or mercapto group, and R represents a hydrogen atom, or a lower alkyl or a substituted or unsubstituted aryl radical.

In this specification and in the appended claims, the terms "lower alkyl" connotes straight or branch-chain alkyl groups containing no more than six carbon atoms.

(b) Description of the prior art

Compounds of the foregoing General Formula I are known compounds. Of particular importance commercially is the compound in which X represents hydroxy and R represents hydrogen, i.e. 4-hydroxy-1-pyrazolo-(3,4-d)-pyrimidine, commonly referred to as allopurinol.

Allopurinol is a drug useful in the treatment of hyperuricemia in humans associated with gout and other conditions. It is also useful in inhibiting the enzymatic oxidation of mercaptopurine and other purine drugs. As a medicament, it is generally administered to humans orally in tablet form. Dosages of 200 to 300 mg. per day divided into two or three doses is recommended for treatment of mild gout and dosages of 400 to 600 mg. per day is recommended for those having moderately severe tophaceous gout. The compound is referred to, and generally described by, R. K. Robins, J.A.C.S., 78, 784–790, 1956.

Various processes are described in the prior art for the preparation of compounds of the General Formula I. Usually, they involve the reaction of a 3-amino-4-carboxylic acid with carboxylic acids in the form of their functional derivatives or of the free acids, provided that in the reactants at least one of the two carboxyl groups contains an amino group suitable for ring closure, and in the resulting 4-hydroxy-pyrazolo-(3,4-d)-pyrimidines with free hydroxyl groups the latter, if desired, are replaced by other substituents such as halogen atoms, substituted, for example, etherified, hydroxyl groups or free or substituted amino or mercapto groups. Referred to allopurinol by ways of illustration, this may, for example, be prepared by the following processes:

(i) From 3-amino-pyrazole-4-carboxamide (II)

by reaction with formamide (III)

The 3-amino pyrazole-4-carboxamide II may itself be prepared by reaction of ethoxy methylene malononitrile with hydrazine to form 3-amino-4-cyanopyrazole (cf. U.S. Pat. 2,759,949) which is then hydrolyzed to give II. Alternatively, the 3-amino-pyrazole - 4 - carboxamide II may be prepared by reacting the base formamidine with cyanoacetamide to give 3 - amino - 2 - cyano-acrylamide which is then reacted with hydrazine to produce II.

(ii) From 3-amino-4-carbethoxy-pyrazole (IV)

by reaction with formamide III.

The 3-amino-4-carbethoxy-pyrazole may itself be prepared by reacting ethoxy methylene cyanoacetic acid ester with hydrazine.

In summary, processes (i) and (ii) for the preparation of compounds of Formula I such as allopurinol proceed through an aminopyrazole carboxylic acid derivative, and the necessary pyrimidine ring is formed thereon subsequently, for example, by reaction with a functional derivative of formic acid like formamide.

The above-mentioned prior art processes are associated with certain significant disadvantages. For instance, the condensation of the aminopyrazoles to the pyrazolopyrimidines is customarily effected at elevated temperature, preferably about or above 100° C., in the presence of a diluent and/or condensing agent, under atmospheric or superatmospheric pressure. Furthermore, with regard to allopurinol, in many instances the product resulting from prior art processes has been contaminated, especially with pyridine derivatives etc., which are rather insoluble and which tend to be yellowish in colour. Since allopurinol is a drug which often must be continuously used by chronically ill patients, objectionable impurities cannot be tolerated. These impurities, therefore, need to be removed using costly and tedious procedures in order to provide a drug product which is acceptable for administration.

With the foregoing points in mind, it is a principal object of this invention to provide a novel approach to, and process for, the preparation of pyrazolo-(3,4-d)-pyrimidine compounds of the General Formula I which need not involve elevated temperatures, a condensing agent or elaborate, costly equipment, and which afford the compounds in good yield and in a relatively pure state so that extensive purificttion is not usually required.

SUMMARY OF THE INVENTION

The present invention is based upon the finding of a novel and advantageous route to compounds of the General Formula I which, in contradistinction to the above described processes, proceeds through a pyrimidine, rather than a pyrazolo, compound. Thus, the process provided by this invention in its broadest aspect utilises as a starting material a pyrimidine compound of the General Formula V below:

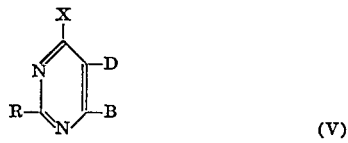

(V)

wherein R represents hydrogen atom, or a lower alkyl or a substituted or unsubstituted aryl radical, B represents a reactive group as hereinafter defined, D represents an aldehyde or an equivalently fuctioning group and X represents a halogen atom, preferably chlorine or bromine, or an equivalently functioning group that may be readily transformed, if desired, into or replaced by another group, such, for example, as a free or substituted hydroxyl, amino or mercapto group. In this process, the essential pyrazole ring is generated across the 4,5-positions in the pyrimidine moiety by reaction of a compound of General Formula V under controlled conditions with the base hydrazine or hydrazine hydrate, whereby a compound of Formula I is obtained in good yield.

According to the present invention, therefore, there is provided a process for the preparation of 4-mono- or 4,6-di-substituted - 1 - pyrazole-(3,4-d)-pyrimidine compounds having the General Formul I above wherein X and R have the same significance as hereinbefore which process comprises reacting a pyrimidine compound having the General Formula V wherein R,B,D and X have the same significance as hereinbefore with hydrazine or hydrazine hydrate.

In those instances, in which X is not the substitutent desired in the final compound, then it may be transformed into, or replaced by, that substituent by methods known to be suitable for effecting such a transformation so resulting in the desired compound. For instance, when X represents chloro or bromo it may be exchanged for free or substituted hydroxyl groups, or free or substituted amino or mercapto groups by any suitable known method, as, for example, by hydrolysis or by reaction with an alcoholate, thiourea, metal salt of hydrogen sulfide or a mercaptan, or with ammonia or an amine. The word "known" as used in this specification and appended claims in relation to the transformation of substituent X, designates procedures in actual use or described in the literature on the subjects. In this sense, some of the compounds of Formula I may serve as intermediates for the synthesis of others of the same general formula.

The term "reactive group" is used herein connotes a group which will react, if necessary in the presence of a catalyst or initiator for the reaction and under appropriate temperature conditions, with a hydrogen atom attached to a nitrogen atom in the hydrazine reactant, so causing a direct C—N bond to be formed. Halogen, especially chloro, is an instance of a suitable reactive group.

DETAILED DESCRIPTION OF THE INVENTION

In a preferred embodiment of this invention, 4-mono- or 4,6 - di-substituted-1-pyrazolo - (3,4-d) - pyrimidine compounds of the General Formula I'

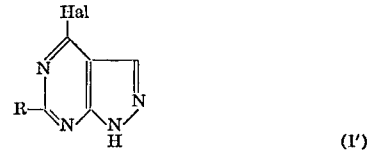

(I')

wherein Hal represents a chlorine or bromine atom and R represents a hydrogen atom or a lower alkyl or a substituted or unsubstituted aryl group are prepared by a process which comprises reacting a pyrimidine compound of the General Formula V'

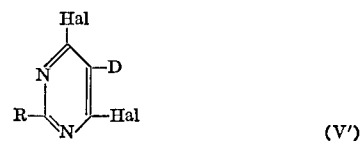

(V')

wherein R and Hal have the same significance as in Formula I' above and D represents an aldehyde or an equivalently functioning group with hydrazine or hydrazine hydrate in a suitable solvent. Thereafter, if desired, the 4-halo group may be transformed into, for example, a free or substituted hydroxyl, amino or mercapto group to give other compounds of the General Formula I.

A highly preferred embodiment of this invention is directed to the preparation of the compound, 4-hydroxy-1-pyrazole-(3,4-d)-pyrimidine, allopurinol, by a procedure involving a two-stage reaction sequence proceeding through a corresponding 4-halo compound as an intermediate. In the first stage, a 4,6-dihalo-, conveniently 4,6-dichloro-, 5-formylpyrimidine is reacted with hydrazine or hydrazine hydrate, preferably the latter, in the presence of an organic solvent or water to give a 4-halo-, conveniently 4-chloro-, 1-pyrazole - (3,4-d) - pyrimidine. The second stage calls for the hydrolysis of the 4-halo- group, conveniently 4-chloro, into hydroxy by any procedure known to effect this transformation thereby yielding the desired compound of General Formula I (X=hydroxy) in good yield. At least 1 mole of the hydrazine reactant should be employed per mole of the pyrimidine compound, and preferably between 1.1 and 2 moles of the hydrazine reactant is employed per mole of the pyrimidine compound. Since hydrogen halide is liberated during this reaction, it is advantageous to have present an acid-binding agent, for instance, a base, such as triethylamine. However, if, as is often convenient, the hydrazine reactant is present in a substantial excess, then it can serve for this purpose, so obviating the need for including an additional substance as an acid-binding agent. Conveniently, the reaction is carried out in water as a solvent, in which the pyrimidine compound is at least partially soluble, and hydrazine hydrate very soluble. However, various organic solvents may be employed including, for example, dioxane or lower alcohols such as methanol, ethanol, propanol and butanol. Dioxane is usually the organic solvent of choice. The condensation with hydrazine hydrate is noteworthy as proceeding rapidly at or even below room temperature and, surprisingly, the reaction proceeds smoothly to give good yields of a 4-halo-, conveniently 4-chloro-, 1-pyrazolo-(3,4-d)-pyrimidine when conducted at between 0° and 30° C.; preferably between 0° and 15° C. in the absence of a condensing agent. However, heat may be applied, if desired. The product so-obtained may be isolated in a conventional manner, for example, by filtration and, if necessary, recrystallized from an organic solvent to give a substantially pure 4-halo-1-pyrazolo-(3,4-d)-pyrimidine as an intermediate compound. Thereafter, the halo, conveniently chloro, group at the 4-position is hydrolysed to hydroxy. This conversion may be effected in various ways, for example, by recrystallizing the compound from boiling water or an aqueous mineral acid or acetic acid in the presence of charcoal to give substantially pure 4-hydroxy-1-pyrazolo-(3,4-d)pyrimidine. However, it is not necessary to isolate and purify the 4-halo intermediate compound and, if desired, the two steps can be combined in one operation which, in practice is generally preferred. It will readily be apparent that the 4-halo compounds can also serve as intermediates for the synthesis, by an appropriate conversion, of compounds of the General Formula I in which X is something other than hydroxy. Thus, for example, the halogen may be replaced by an etherified hydroxyl group or free or substituted amino or mercapto groups in the usual manner, for example, by reaction with an alcoholate, thiourea, metal salt of hydrogen sulfate or a mercaptan, or with ammonia or an amine like diethylamine.

The 4,6-dihalo-5-formylpyrimidine starting compounds are readily accessible. Thus, 4,6-dichloro-5-formylpyrimidine, may be conveniently and readily prepared following the procedure of Klotzer and Herberz as described in Monatshefte für Chemie, 96, 1567–1572, 1965, which involves the condensation of 4,6-dihydroxy-pyrimidine with dimethylformamide in the presence of phosphorus oxychloride, or by the procedure described by Bredereck et al. Chem. Ber. 100, 1344–52, 1967.

The aldehydric function present in the 5-formylpyrimidine starting compounds may be replaced by an equivalent group such as a masked aldehydic function. For example, an acetal resulting from the interaction between an aldehyde compound of Formula III and an alcohol such as methanol, ethanol, ethylene glycol and the like is also a suitable starting material.

This two-stage process for the preparation of the preferred compound allopurinol, is illustrated in the following flow sheet.

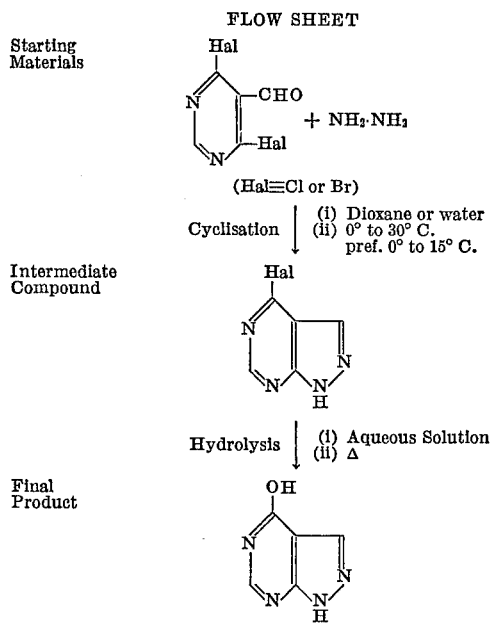

DESCRIPTION OF ILLUSTRATIVE EMBODIMENTS

The invention will now be further described with reference to the following examples in which all melting point data was obtained by the capillary tube method.

Example 1.—4-chloro-1-pyrazolo-(3,4-d)-pyrimidine

Part A: 4,6-dichloro-5-formylpyrimidine.—4,6-dichloro-5-formylpyrimidine was prepared following the procedure decribed in the aforementioned article by Klotzer and Herberz involving the condensation of 4,6-dihydroxy-5-pyrimidine with dimethylformamide in the presence of phosphorus oxychloride.

Part B: 4 - chloro - 1 - pyrazolo-(3,4-d)-pyrimidine.—8.85 g. of 4,6-dichloro-5-formylpyrimidine prepared by the procedure of Part A were added to 150 ml. of water in a three-neck flask fitted with a stirrer, and the resultant suspension cooled to a temperature of 10° C. 5 g. of 100% hydrazine hydrate were added, during which time the contens of the flask were stirred, and this stirring was continued while the reaction proceeded. Completion of the hydrazine hydrate addition was marked by the complete solvation of the pyrimidine compound and a rise in temperature to approximately 20° C. After approximately a minute, a yellow solid precipitated out. With the contents of the flask held at room temperature, the stirring was continued for a further two hours. Then, the solid material was recovered by filtration to give 4-chloro-1-pyrazolo-(3,4-d)pyrimidine in good yield. Verification of the authenticity of the material was provided by the ultraviolet and infra-red spectra, and by a melting point determination which showed that the compound had a decomposition melting point of around 130° C. (lit. 130–135° C.—Robins, loc. cit.).

Example 2.—4-chloro-1-pyrazolo-(3,4-d)-pyrimdine 3.54 g. of 4,6-dichloro-5-formylpyrimidine prepared by the procedure of Part A of the foregoing example were dissolved in 50 ml. of absolute methanol and, with the temperature at 0° C., 2 g. of hydrazine hydrate (99%) were added rapidly while constantly stirring. The stirring was continued for an additional 1 hour with the temperature held at 0° C.

The reaction mixture was then evaporated to dryness under reduced pressure and the residue extracted several times with boiling benzene. The 4-chloro-1-pyrazolo-(3,4-d)-pyrimidine crystallized out on cooling.

Example 3.—4-chloro-1-pyrazolo-(3,4-d)-pyrimidine 6.06 g. of triethylamine were added rapidly to a solution of 10.62 g. of 4,6-dichloro-5-formylpyrimidine, prepared by the procedure of Part A of the Example 1, in 240 ml. of dioxane cooled to 10° C. 3.30 g. of 100% hydrazine hydrate were added slowly with continued stirring and cooling so as to maintain the reaction temperature at between 10° and 15° C. After completion of the addition, cooling was discontinued and the mixture stirred a further 2.5 hours at room temperature. The precipitated triethylamine hydrochloride was filtered-off and washed with 50 ml. of dioxane. From the combined filtrate and washings the solvent was distilled to dryness in vacuo, and the residue refluxed in 900 ml. of benzene for 30 minutes. The mixture was filtered hot, and the solvent distilled from the filtrate, to give 4-chloro-1-pyrazolo-(3, 4-d)-pyrimidine in good yield.

Example 4.—4-bromo-1-pyrazolo-(3,4-d)-pyrimidine

Part A: 4,6 -dibromo - 5 - formylpyrimidine.—62.5 ml. phosphorus oxychloride in 160 ml. dry chloroform were added dropwise to a solution of 107 g. of anhydrous dimethylformamide in 250 ml. dry chloroform which was continuously stirred. During the addition, the internal temperature was maintained at 10° to 15° C. The resulting mixture was stirred at room temperature for 1.5 hours. At the end of this period, 50.0 g. of 4,6-dihydroxypyrimidine were added, whereby the temperature of the reaction mixture rose to 50°–60° C., at which it was held for 2 hours. The reaction mixture was then allowed to stand overnight at room temperature. The crystalline precipitate so-obtained was filtered off, washed with dry chloroform and dried in vacuo. The yield was almost quantitative, M.P. 238°–241° C. A mixture of 16.5 g. of the above complex and 60.0 g. of phosphorus oxybromide was stirred at 160° C. for 1.25 hours. The resulting viscous solution was cooled to about 15° C. and slowly poured onto ice with rapid stirring. The aqueous solution was then extracted exhaustively with ether and the ether extracts washed with sodium bicarbonate solution. The ether layer was dried over anhydrous sodium sulfate overnight. Thereafter, the dry ether solution was evaporated to dryness and the residue suspended in dry cyclohexane. The resulting 4,6-dibromo-5-formylpyrimidine had a M.P. of 103° C. Analysis of the product yielded the following result:

$C_5H_2N_2OBr_2$.—Calculated (percent): C, 22.58; H, 0.76; N, 10.54; Br, 60.11. Found (percent): C, 22.59; H, 0.71; N, 10.74; Be, 60.48.

Part B: 4 - bromo - 1 - pyrazolo - (3,4-d)-pyrimidine.— 1.4 ml of triethylamine were added to a solution comprising 2.64 g. of 4,6-dibromo-5-formyl-pyrimidine in 60 ml. dioxane at a temperature of 10° C. 0.55 g. of 100% hydrazine hydrate were added slowly with continued stirring and cooling on an ice bath so as to keep the internal temperature at 10°–15° C. After the addition, the ice bath was removed, and the mixture stirred for a further 2.5 hours at room temperature. The precipitated triethylamine hydrobromide was filtered-off and washed with 10 ml. dioxane. The combined filtrate and washings were evaporated to dryness in vacuo while keeping the water bath temperature below 60° C. The resulting 4-bromo-1-pyrazolo-(3,4-d)-pyrimidine had a decomposition melting point of around 115° C.

Example 5.—4-bromo-1-pyrazolo-(3,4-d)-pyrimidine

Part A: 4,6-dibromo - 5 - formylpyrimidine.—A mixture of 4.2 g. of the hydrochloride of 4-hydroxy-6-oxo-5 - dimethylamino-methylene - 5, 6 - dihydropyrimidine (Bredereck et al., Chem. Ber. 100, 1344, 1967) and 18.0 g. of phosphorus oxybromide was heated with continuous stirring for one hour at 160° C. and then poured onto ice. The product was extracted with ether and recrystallized from a hexane-chloroform mixture. The substantially pure 4,6 - dibromo - 5 - formylpyrimidine so-obtained had a M.P. of 103°–104° C. Analysis of the produce yielded the following result:

$C_5H_2Br_2N_2O_2$.—Calculated (percent): C, 22.58; H, 0.76; N, 10.54; Br, 60.11. Found (percent): C, 22.99; H, 0.71; N, 10.74; Br, 60.48.

Part B.—4-bromo - 1 - pyrazolo-(3,4-d)-pyrimidine.— 2.64 g. of the dibromaldehyde prepared by the procedure of Part A were dissolved in 60 ml. of dry dioxane and 1.4 ml. of triethylamine and 0.55 g. of 100% hydrazine hydrate were added thereto at 10° C. The reaction mixture was then stirred for 2.5 hours. The precipitated triethylamine hydrobromide was filtered-off and the filtrate evaporated to dryness, giving crude 4-bromo-1-pyrazolo-(3,4-d)-pyrimidine.

Example 6.—4-chloro-6-phenyl-1-pyrazolo-(3,4-d)-pyrimidine

Part A: 2-phenyl - 4,6 - dichloro-5-formylpyrimidine.— This compound was prepared by the procedure of Klotzer and Herberz loc. cit, involving the reaction of 18.8 g. 2-phenyl - 4 - hydroxy - 6 - oxo - 5,6 - dihydropyrimidine, 56 ml. phosphorus oxychloride and 14.6 g. dimethyl formamide.

Part B: 4-chloro - 6 - phenyl - 1 - pyrazolo-(3,4-d)-pyrimidine.—7.2 g. of 2-phenyl - 4,6 - dichloro-5-formylpyrimidine were dissolved in 240 ml. dioxane and the resulting solution cooled to 10° C. 4.2 ml. of triethylamine and 1.65 g. of 100% hydrazine hydrate were added to this cooled solution. The resulting reaction mixture was then stirred at room temperature for 2 hours. The precipitated triethylamine hydrochloride was filtered-off and the filtrate evaporated to dryness to give crude 2-phenyl-4,6-dichloro - 5 - formylpyrimidine, a sample of which was recrystallized from acetone, M.P. 223°–224° C. Partial analysis of this product yielded the following result:

$C_{11}H_7N_4Cl$.—Calculated (percent): Cl, 15.37. Found (percent): Cl, 14.84.

Example 7.—4-chloro-6-methyl-1-pyrazolo-(3,4-d)-pyrimidine

Part A: 2-methyl - 4,6 - dichloro-5-formylpyrimidine.— This compound was prepared by the procedure of Bredereck et al. loc. cit., involving the reaction of 2.7 g. 4-hydroxy - 6 - oxo - 2 - methyl - 5 - dimethylaminomethylene - 5,6 - dihydropyrimidine with 100 ml. phosphorus oxychloride (M.P. 105°–107° C.).

Part B: 4-chloro - 6 - methyl - 1 - pyrazolo - (3,4-d)-pyrimidine.—3.82 g. of the 2-methyl - 4,6 - dichloroaldehyde prepared by the procedure in Part A was dissolved in 25 ml. of dioxane and, with the solution cooled to and held at 10° C., 2.8 g. of triethylamine and 1.1 g. of 100% hydrazine hydrate were added thereto. The reaction mixture was stirred for 2.5 hours. Thereafter the triethylamine hydrochloride which precipitated out was filtered-off and the filtrate evaporated to dryness. A sample of the crude product recrystallized from benzene had a decomposition melting point of 135°–138° C.

Example 8.—4-chloro-5-(2-dioxolano)-6-hydrazinopyrimidine 3.8 g. of 100% hydrazine hydrate were added to a solution of 8.3 g. of the cyclic acetal resulting from a reaction between 4,6-dichloro - 5 - formylpyrimidine and ethylene glycol (c.f. procedure of Klotzer and Herberz loc. cit.) in 80 ml. of 1,2-dimethoxyethane, maintained at 0° C., then at room temperature overnight. The solid material was collected by filtration and washed with water, to give substantially pure 4-chloro-5-(2-dioxolano)-6-hydrazinopyrimidine, decomposition melting point around 130° C.

The foregoing procedures provide novel routes to the known 4 - halo-6-R-1-pyrazolo-(3,4-d)-pyramidine compounds which utilise readily accessible and relatively inexpensive reactants, and give the desired compounds in good yield. Moreover, the hydrazine hydrate cyclisation with concomitant formation of the pyrimidine ring is a smooth reaction that does not require applied heat or elaborate equipment. Other compounds having the General Formula I may be obtained by similar procedures starting from an appropriately substituted pyrimidine compound.

That the 4,6-dichloro- and 4,6 - dibromo-5-formylpyrimidine compounds and hydrazine hydrate should react together in this particular way, i.e. with formation of a pyrazole ring, is surprising because the skilled organic chemist would have anticipated that a number of undesirable side reactions would occur involving, for instance, formation of the pyrazole ring and concomitant replacement of the 6-halo atom by a hydrazine group, or formation of a dimer linked by a hydrazine group. Indeed, it has been observed that if the reaction conditions, such as temperature, relative ratios of the reactants or the solvent are not properly selected and controlled, side reactions such as those mentioned may in fact occur. For instance, when the procedure of Part B of Example 1 was repeated using a larger excess of hydrazine hydrate say much in excess of 2 moles than that employed in that example, a substantial amount of hydrazino - 1 - pyrazolo-(3,4-d)-pyrimidine was obtained. Again, when the procedures of Example 1, Part B, and Examples 2 and 3 were carried out in acetic acid as the solvent, a significant amount of azine resulting from the interaction of one mole of hydrazine with 2 moles of 4,6 - dichloro-5-formylpyrimidine was produced as a by-product and the yield of the desired 4 - chloro - 1 - pyrazolo - (3,4-d) - pyrimidine was reduced. With the foregoing teaching and illustrative examples in mind, the selection of optimum temperature, reactant concentrations and solvent for the preparation of a particular compound of Formula I can be readily determined, if need be, by a few trials in which the several parameters are varied.

As previously indicated, the 4-halo-6-R-1-pyrazolo-(3,4-d)-pyrimidine compounds obtained by the procedures of Examples 1 to 8 are valuable intermediates for the synthesis of other compounds having the General Formula I. Of these compounds, the corresponding 4-hydroxy compounds, and especially 4-hydroxy-1-pyrazolo-(3,4-d)-pyrimidine (because of its known pharmacological activity and utility in chemotherapy) are particularly important. The transformation of 4-halo compounds into the 4-hydroxy analogues is illustrated in the following examples.

Example 9.—4-hydroxy-1-pyrazolo-(3,4-d)-pyrimidine 0.25 g. of 4-chloro-1-pyrazolo-(3,4-d)-pyrimidine prepared by the procedure of Part B of Example 1 hereinbefore were suspended in 20 ml. of water and the resulting suspension heated until the chloro compound had completely dissolved. After treatment with activated charcoal, the solution was filtered hot and concentrated to 10 ml. After cooling to 5° C., the precipitated 4-hydroxy-1-pyrazolo-(3,4-d)-pyrimidine was collected by filtration and dried in vacuo at 60° C. Verification of the authenticity of the product was provided by the ultraviolet and infra-red spectra, as well as a melting point determination which showed that it did not melt when heated to 300° C.

Example 10.—4-hydroxy-1-pyrazolo-(3,4-d)-pyrimidine 2 g. of 4-chloro-1-pyrazolo-(3,4-d)-pyrimidine obtained by the procedure of Example 8 hereinbefore were suspended in 60 ml. of 90% aqueous acetic acid containing 0.74 g. of anhydrous sodium acetate and the resulting mixture was heated under reflux for one hour. After cooling to room temperature a small amount of undissolved material was removed by filtration, the filtrate concentrated to small volume in vacuo, and thereafter diluted with acetone. The precipitated 4-hydroxy-1-pyrazolo-(3,4-d)-pyrimidine was collected and dried. It could be recrystallized from boiling water to give a colourless powder which did not melt at 300° C. The crude yield was 1.2 g. (96%).

Example 11.—4-hydroxy-1-pyrazolo-(3,4-d)-pyrimidine 0.25 g. of 4-bromo-1-pyrazolo-(3,4-d)-pyrimidine prepared by the procedure of Example 4, Part B hereinbefore was suspended in 20 ml. of water and the resulting suspension heated until the bromo compound had completely dissolved. After treatment with activated charcoal, the solution was filtered hot and the filtrate concentrated to 10 ml. The solution was cooled to 5° C., whereupon 4-hydroxy-1-pyrazolo-(3,4-d)-pyrimidine precipitated out. It was removed by filtration, washed and dried.

Example 12.—4-hydroxy-6-phenyl-1-pyrazolo-(3,4-d)-pyrimidine

This compound was obtained from the crude (i.e. non-recrystallized material) 4-chloro-6-phenyl-1-pyrazolo-(3,4-d)-pyrimidine prepared by the procedure of Example 6, Part B hereinbefore following exactly the same procedure as set forth in the foregoing example. The precipitated 4-hydroxy-6-phenyl-1-pyrazolo-(3,4-d)-pyrimidine so-obtained was recrystallized from acetic acid and methanol to give an analytically pure sample which did not melt when heated to 300° C. Analysis of this product yielded the following result:

$C_{11}H_{18}N_4O$.—Calculated (percent): C, 62.25; H, 3.80; N, 26.40. Found (percent): C, 62.06; H, 3.99; N, 26.66.

Example 13.—4-hydroxy-6-methyl-1-pyrazolo-(3,4-d)-pyrimidine

This compound was obtained from the crude 4-chloro-6-methyl-1-pyrazolo-(3,4-d)-pyrimidine prepared by the procedure of Example 7, Part B hereinbefore following the procedure as set forth in Example 11 above. The precipitated 4-hydroxy-6-methyl-1-pyrazolo-(3,4-d)-pyrimidine so-obtained was recrystallized from acetic acid to give an analytically pure sample that did not melt when heated to 300° C.

As mentioned hereinbefore, 4-hydroxy-1-pyrazolo-(3,4-d)-pyrimidine is useful in chemotherapy in the treatment of gout, for which purpose it may be administered in the form of pharmaceutical compositions containing the compound in admixture with a pharmaceutically acceptable carrier.

The preparations may be made by any of the methods known to be suitable for preparing pharmaceutical preparations and may contain as accessory ingredients any acceptable excipient including, for example, diluents, flavouring, buffer, dispersing, binding, lubricating and coating materials.

What is claimed is:

1. A process for the preparation of 4-mono- or 4,6-di-substituted 1-pyrazolo-(3,4-d)-pyrimidine compounds of the following Formula I:

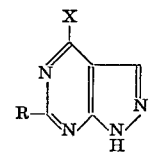

(I)

wherein X represents a halogen atom or a hydroxyl group and R represents a hydrogen atom, a lower alkyl group containing one to six carbon atoms or a phenyl group which comprises reacting in a solvent hydrazine or hydrazine hydrate at a temperature of between about 0° and about 30° C. with a pyrimidine compound of the General Formula V:

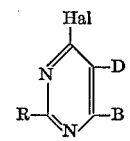

(V)

wherein R has the same significance as in Formula I above, B represents a halogen atom, D represents an aldehyde group, and Hal represents a halogen atom, from 1 to 2 moles of said hydrazine reactant being used per mole of said pyrimidine compound, and thereafter, to obtain the compound of Formula I wherein substituent X is hydroxyl, transforming the halogen substituent X into hydroxyl by hydrolysis.

2. A process as claimed in claim 1, wherein X represents a chlorine or bromine atom.

3. A process as claimed in claim 2, wherein said hydrazine reactant is used in an amount between about 1.1 and about 2 moles of hydrazine reactant per mole of said pyrimidine compound.

4. A process as claimed in claim 3, wherein the reaction with said hydrazine or hydrazine hydrate is conducted in water, dioxane or a lower alcohol as solvent in the presence of an acid-binding agent.

5. A process as claimed in claim 4, wherein said acid-binding agent is triethylamine.

6. A process as claimed in claim 4, wherein said binding agent is excess hydrazine or hydrazine hydrate.

7. A process as claimed in claim 4, wherein the reaction with said hydrazine or hydrazine hydrate is conducted at a temperature of between about 0° and about 15° C.

8. A process as claimed in claim 7, for the preparation of 4-hydroxy-1-pyrazolo-(3,4-d)-pyrimidine wherein 4,6-dichloro-5-formylpyrimidine is reacted in dioxane in the presence of triethylamine and the 4-chloro-1-pyrazolo-(3,4-d)-pyrimidine so-obtained is hydrolyzed in aqueous acid by heating.

9. A process as claimed in claim 2, wherein the 4-halo-1-pyrazolo-(3,4-d)-pyrimidine is not isolated prior to the hydrolysis step.

10. A process as claimed in claim 9, wherein the hydrolysis is effected by heating an aqueous solution or suspension of the 4-halo-1-pyrazolo-(3,4-d)-pyrimidine compound, or by heating an acidified aqueous solution or suspension of the 4-halo-1-pyrazolo-(3,4-d)-pyrimidine.

References Cited

Elderfield (ed.): Heterocyclic Compounds, vol. 8, Wiley, New York, 1967, pp. 414–5.

Nesmeyanov et al.: Chem. Abstracts, 45:1585 (1951), 46:3007 (1952).

RICHARD J. GALLAGHER, Primary Examiner